United States Patent
Xu (10) Patent No.: US 7,657,645 B2
(45) Date of Patent: Feb. 2, 2010

(54) SYSTEM AND METHOD FOR TRANSPORTING MPEG2TS IN RTP/UDP/IP

(75) Inventor: Shugong Xu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1005 days.

(21) Appl. No.: 10/772,815

(22) Filed: Feb. 5, 2004

(65) Prior Publication Data
US 2005/0177643 A1    Aug. 11, 2005

(51) Int. Cl.
*G06F 15/16* (2006.01)
(52) U.S. Cl. .............. 709/231; 709/204; 709/206; 709/230; 709/232; 370/252
(58) Field of Classification Search ......... 709/230–233, 709/204, 206; 370/252
See application file for complete search history.

(56) References Cited

U.S. PATENT DOCUMENTS

| | | | | |
|---|---|---|---|---|
| 6,542,504 B1 * | 4/2003 | Mahler et al. ............. | 370/392 |
| 6,904,095 B1 * | 6/2005 | Wilkinson et al. ..... | 375/240.26 |
| 7,274,863 B2 * | 9/2007 | Ando ..................... | 386/112 |
| 2004/0103149 A1 * | 5/2004 | Tanigawa et al. ........... | 709/204 |
| 2004/0190459 A1 * | 9/2004 | Ueda et al. ................. | 370/252 |
| 2005/0071876 A1 * | 3/2005 | van Beek ................... | 725/62 |

* cited by examiner

*Primary Examiner*—Nathan Flynn
*Assistant Examiner*—Mohammad A Siddiqi
(74) *Attorney, Agent, or Firm*—Law Office of Gerald Maliczewski; Gerald Maliszewski (57) ABSTRACT

Systems and methods are provided for receiving and transmitting an MPEG2 transport stream (TS) in a real-time protocol (RTP)/user datagram protocol (UDP)/Internet protocol (IP) packet. The receiving method comprises: receiving an IP packet via an IP network, having a variable transmission delay; accessing a timestamp carried in a RTP packet; linking the timestamp with a program clock reference (PCR) MPEG2TS carried in the RTP packet payload; and, using the timestamp to eliminate variable transmission delay jitter, associated with the PCR MPEG2TS. In one aspect of the method, the timestamp has a resolution of greater than 500 nanoseconds (ns), so that the variable transmission delay jitter, associated with the PCR MPEG2TS can be reduced to a jitter of less than 500 ns.

28 Claims, 8 Drawing Sheets

ary every 40 milliseconds (ms). However, ISO 13818 only requires insertion every 100 ms.

SYSTEM AND METHOD FOR TRANSPORTING MPEG2TS IN RTP/UDP/IP

BACKGROUND OF THE INVENTION

1. Field of the Invention

This invention generally relates to the communications of compressed video and, more particularly, to a system and method for minimizing jitter in MPEG2 video data communicated via an Internet Protocol (IP) network.

2. Description of the Related Art

The National Television Standards Committee (NTCS)/Phase Alternation by Line (PAL) timing requirements associated with motion pictures expert group (MPEG)2 video communications are very stringent. Fluctuations of the synthesized color sub-carrier cause an impairment of the picture quality. Thus, for a broadcast-level video system, the system frequency requirements might be as tight as +/−3 parts per million (PPM). If a free-running decoder is installed in a personal computer (PC), it may be subject to overflow or underflow, which also damages picture quality.

Figure 10:
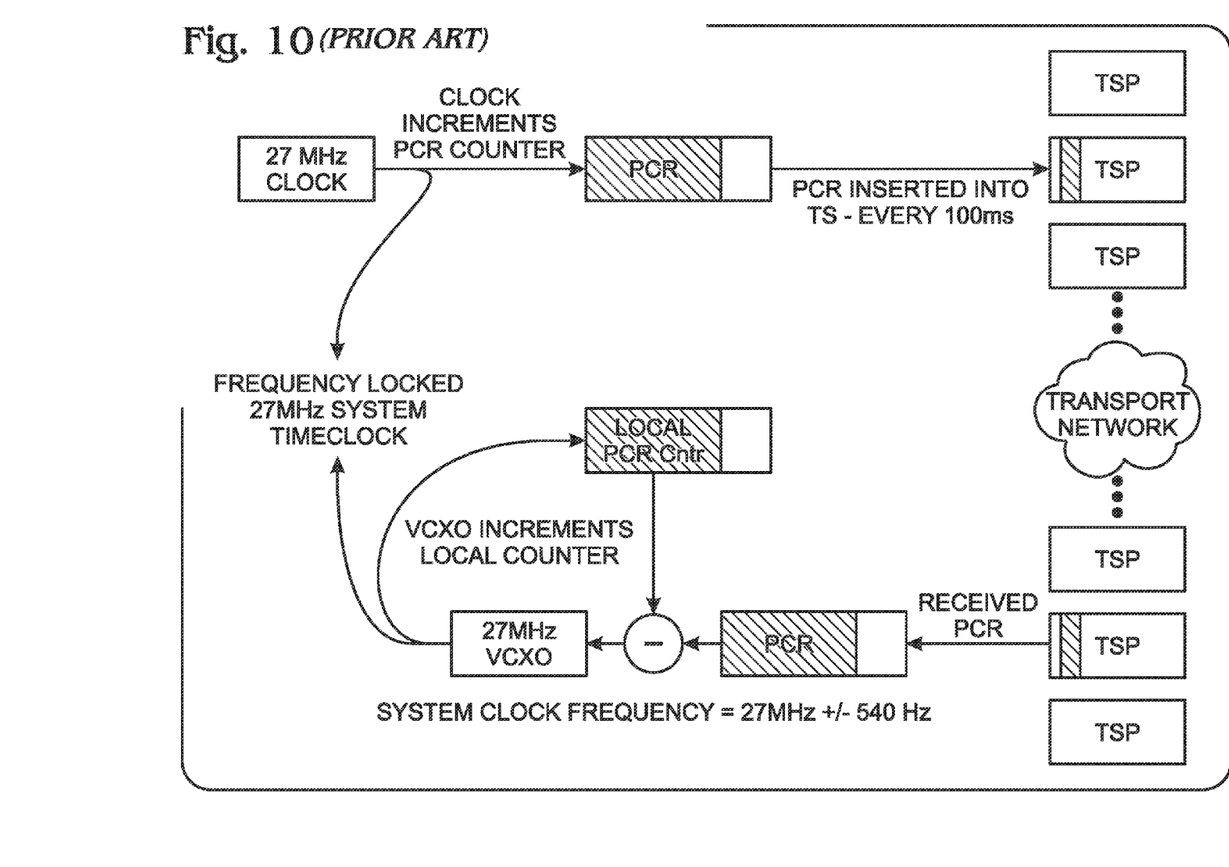
FIG. 10 is a diagram illustrating the transport of the program clock reference (PCR) used in synchronizing an MPEG systems clock (prior art).

FIG. 10 is a diagram illustrating the transport of the program clock reference (PCR) used in synchronizing an MPEG systems clock (prior art). The PCR is a timestamp included in a PCR MPEG2 transport stream (TS). The PCR MPEG2TS is typically inserted into the communications stream approximately every 40 milliseconds (ms). However, ISO 13818 only requires insertion every 100 ms.

Figure 11:
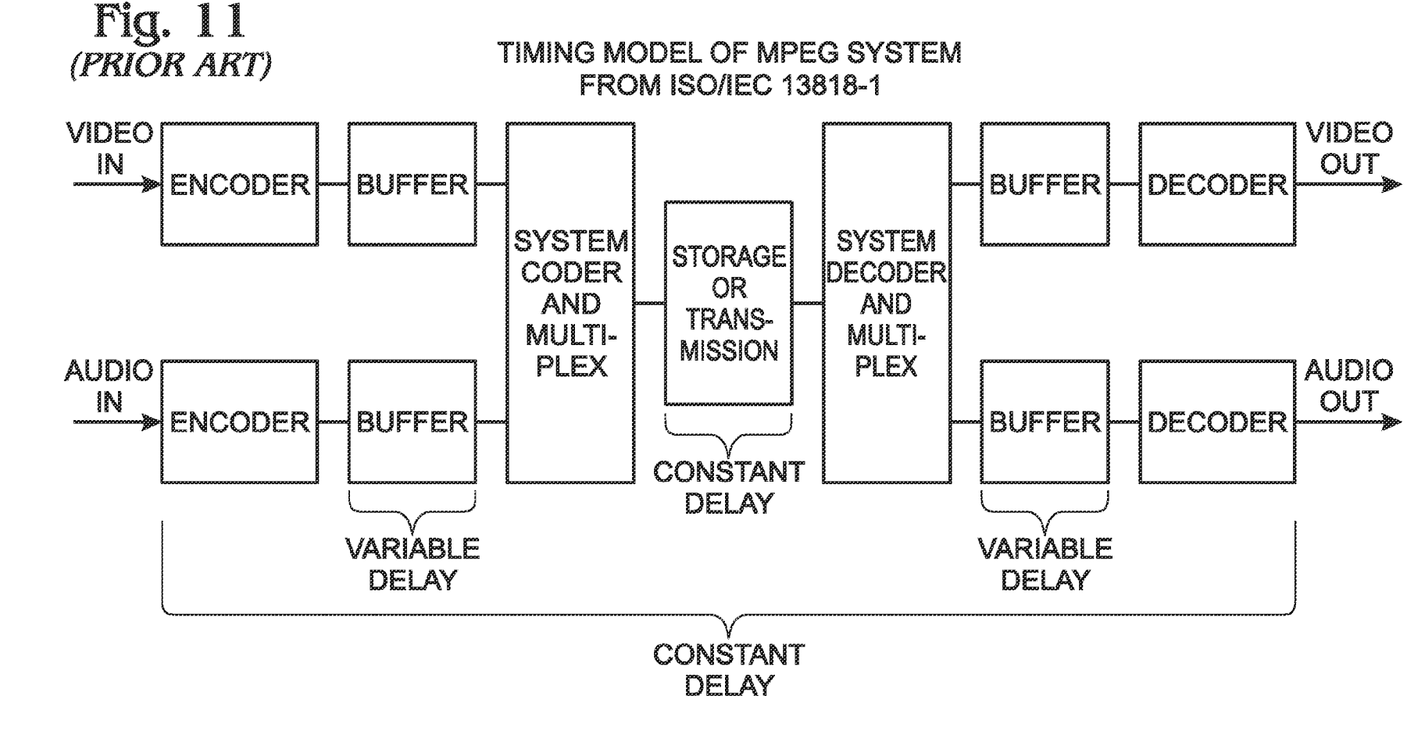
FIG. 11 is a timing model of an MPEG system, as specified in ISO/IEC 13818-1 (prior art).

FIG. 11 is a timing model of an MPEG system, as specified in ISO/IEC 13818-1 (prior art). Although there are variable delays associated with the buffering of the video on both the receive and transmit sides, the constant storage and/or transmission delay permits the overall delay, from Video In to Video Out, to remain constant. Any dithering that occurs in transmission is taken care of in the decoding process. As a result, the PCR jitter can be kept less than 500 nanoseconds (ns). However, when MPEG video is transmitted via an Internet Protocol (IP) network, the storage and transmission delays may vary. There is no requirement that MPEG2 packets be transported per a schedule, and the loading and buffering of IP packets before transmission cannot be predetermined. Route change and variation is another contributor to IP network jitter. As a result, the overall delay, from Video In to Video Out, varies and the system timing requirements cannot always be met.

Figure 12:
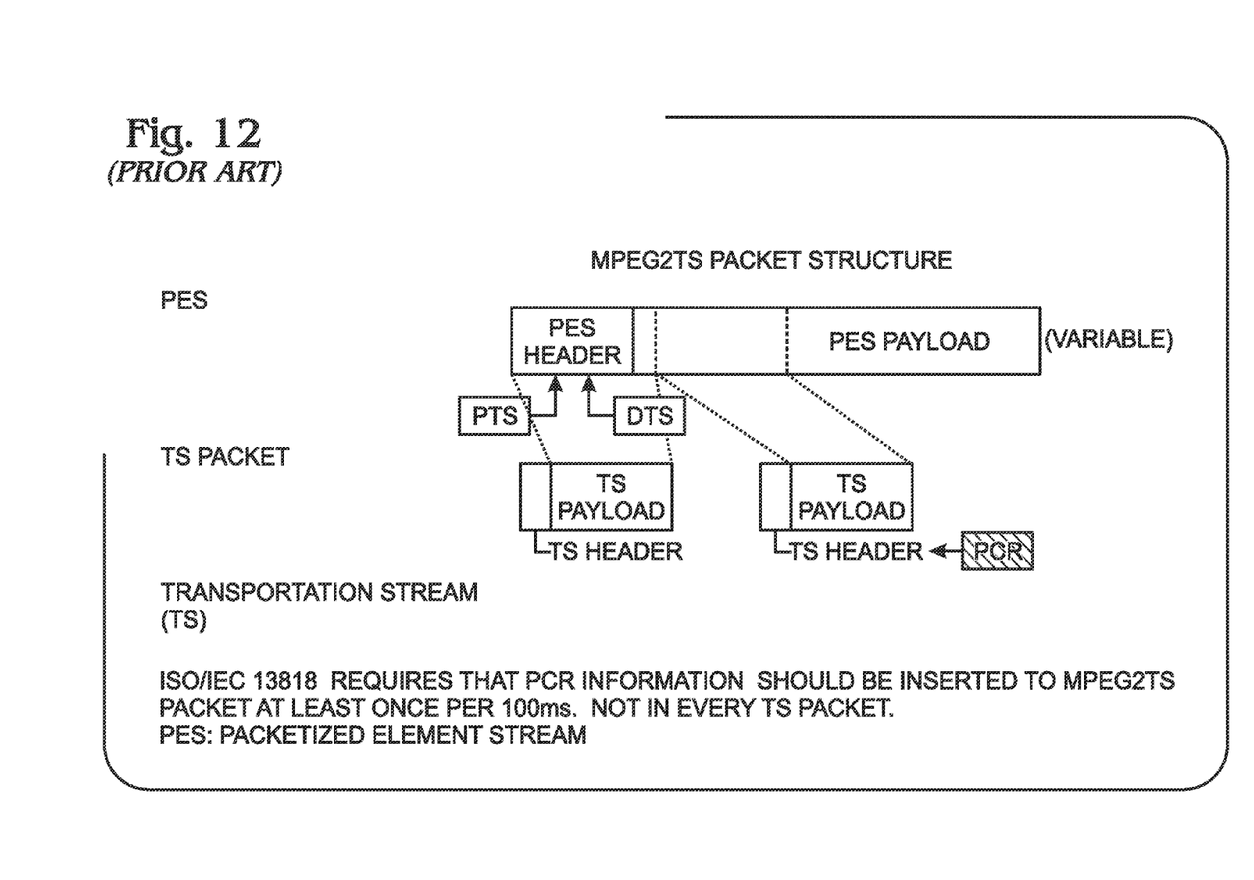
FIG. 12 is a diagram illustrating the MPEG2TS packet structure (prior art).

FIG. 12 is a diagram illustrating the MPEG2TS packet structure (prior art). The PCR timestamp is inserted into a TS header. A MPEG2TS packet, referred to herein as a MPEG2TS, includes TS packets, each made up of a TS header and corresponding TS payload. Note that the PCR is not inserted into every MPEG2TS, as several MPEG2TSs may be communicated in a 100 ms time duration. Using Standard Definition TV (SDTV) as an example, 160 MPEG2TSs typically occur between PCR MPEG2TSs.

Figure 13:
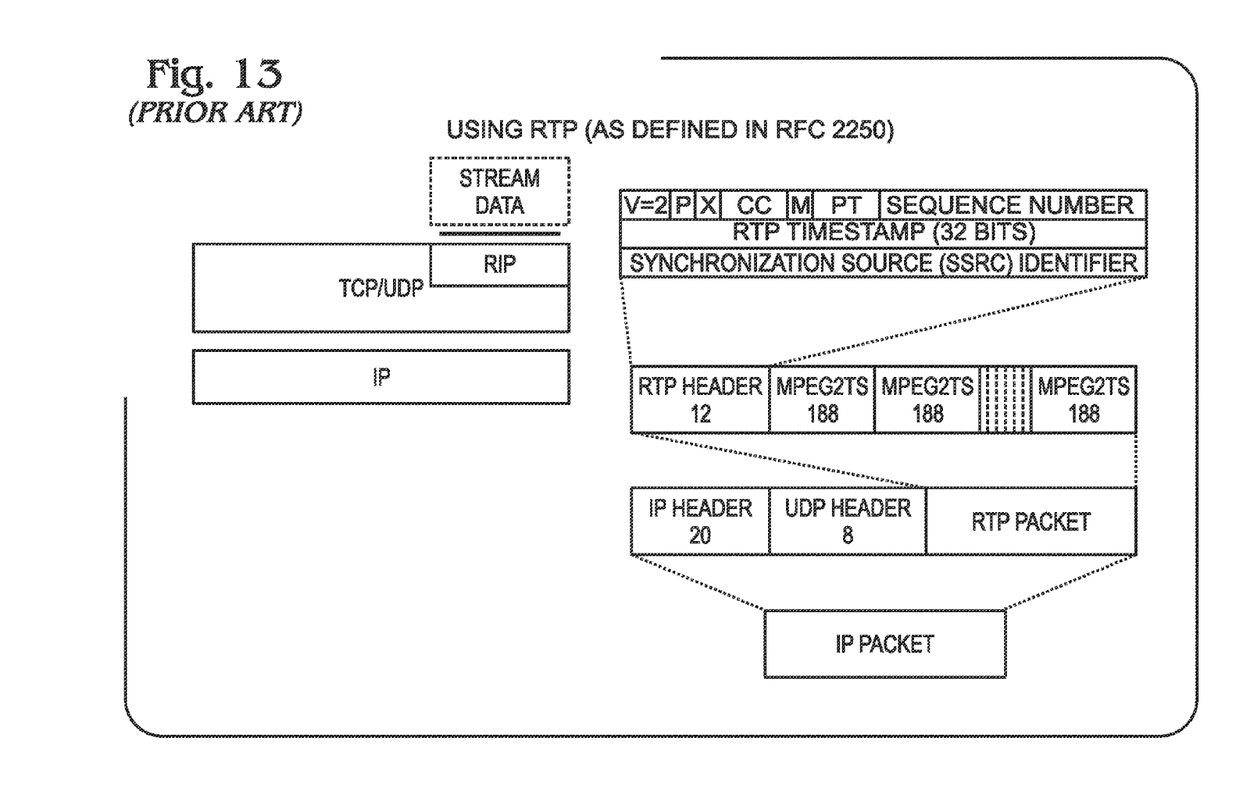
FIG. 13 is a diagram illustrating real-time protocol (RTP) as defined by RFC 2250 (prior art).

FIG. 13 is a diagram illustrating real-time protocol (RTP) as defined by RFC 2250 (prior art). More specifically, a RTP/user datagram protocol (UDP) packet is shown as carried in an IP packet. Conventionally, the RTP packet includes an RTP packet header and a plurality of MPEG2TSs in the RTP payload. The RTP header includes a 32-bit synchronization timestamp, which is referred to herein as a RTP timestamp. Note, the RTP timestamp is not intended for use in recovering the video system target decoder clock. Also note that the RTP timestamp is not associated with any particular MPEG2TS in the RTP payload. Further, the 32-bit RTP timestamp only has a resolution of 90 kilohertz (kHz), insufficient for a 500 ns systems requirement.

It would be advantageous if a means were developed for eliminating, or at least minimizing the MPEG2 systems jitter associated with IP network variable delays.

It would be advantageous if the above-mentioned IP network variable delays could be minimized, by linking a PCR MPEG2TS to a target transmission time.

SUMMARY OF THE INVENTION

The present invention addresses the above-mentioned IP network variable delay issues in the transport of MPEG2TSs through the use of two independent approaches. One approach links a target transmission timestamp with the PCR MPEG2TS. Another approach uses a high-resolution timestamp for the PCR MPEG2TS linkage.

Accordingly, a method is provided for receiving an MPEG2 transport stream (TS) in a real-time protocol (RTP)/user datagram protocol (UDP)/Internet protocol (IP) packet. The method comprises: receiving an IP packet via an IP network, having a variable transmission delay; accessing a timestamp carried in a RTP packet; linking the timestamp with a program clock reference (PCR) MPEG2TS carried in the RTP packet payload; and, using the timestamp to eliminate variable transmission delay jitter, associated with the PCR MPEG2TS.

In one aspect of the method, the timestamp has a resolution of greater than 500 nanoseconds (ns), so that the variable transmission delay jitter, associated with the PCR MPEG2TS can be reduced to a jitter of less than 500 ns.

In three aspects of the aspects, the step of accessing a timestamp carried in the RTP packet includes accessing a RTP timestamp carried in a RTP packet header. For example, the RTP timestamp may be linked with a solitary PCR MPEG2TS carried in the RTP packet payload. In another aspect, the RTP timestamp is linked with a PCR MPEG2TS immediately following the RTP packet header. In a third aspect, the method accesses a timestamp packet index field in the RTP packet header. Then, the timestamp packet index is used to point to a PCR MPEG2TS randomly positioned in the RTP packet payload.

In a fourth aspect, a PCR MPEG2TS index field is accessed in the RTP packet header and the timestamp is a PCR MPEG2TS timestamp carried in a RTP packet header. Then, the PCR MPEG2TS index is used to point to a PCR MPEG2TS randomly positioned in the RTP packet payload. In a fifth aspect, a local timestamp field is accessed in an MPEG2TS delay compensation data structure. The MPEG2TS delay compensation data structure is carried in the RTP packet payload and includes the local timestamp and a corresponding PCR MPEG2TS. Then, the local timestamp is linked to the corresponding PCR MPEG2TS in the MPEG2TS delay compensation data structure. The local timestamps can also be used to reference non-PCR MPEG2TSs.

Additional details of the above-described method, a method for transmitting an MPEG2TS in a RTP/UDP/IP packet, and corresponding receiver and transmission systems are provided below.

DETAILED DESCRIPTION OF THE PREFERRED EMBODIMENTS

Figure 1:
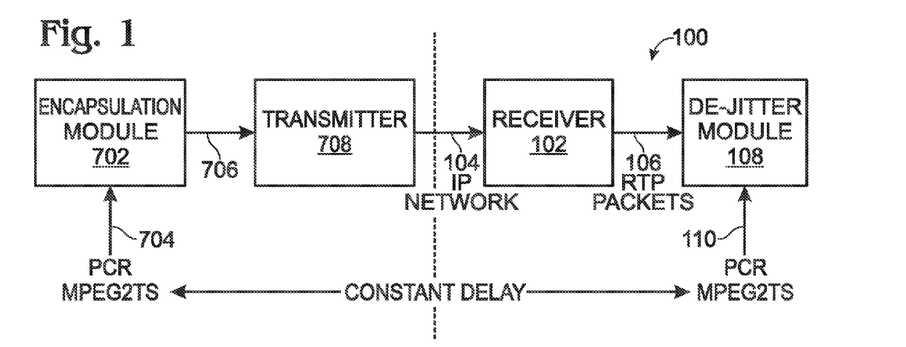
FIG. 1 is a schematic block diagram of the present invention system for receiving an MPEG2TS in a RTP/UDP/IP packet.

FIG. 1 is a schematic block diagram of the present invention system for receiving an MPEG2TS in a RTP/UDP/IP packet. The system 100 comprises a receiver 102 having an IP network interface to receive an IP packet via an IP network on line The IP network has an inherent variable transmission delay. The variable transmission delay problem associated with real-time IP communications has been described in the Background Section, above, and as is understood by those skilled in the art. The receiver 102 has an interface on line 106 to supply a RTP packet. For simplicity, it is assumed that the receiver 102 disassembles the IP packet payloads into RTP packets.

A de-jitter module 108 has an interface on line 106 to accept the RTP packet. The de-jitter module 108 accesses a timestamp carried in a RTP packet, and links the timestamp with a program clock reference (PCR) MPEG2TS carried in the RTP packet payload. The de-jitter module 108 uses the timestamp to eliminate variable transmission delay jitter. More specifically, the de-jitter module 108 reduces jitter associated with a PCR MPEG2TS to an acceptable level. That is, the de-jitter module 108 has an interface on line 110 to supply the PCR MPEG2TS with a constant delay, so that the MPEG2TS can be used to support real-time communications. In some aspects of the system, the de-jitter module 108 accesses a timestamp having a resolution of greater than 500 nanoseconds (ns) and supplies a PCR MPEG2TS with a jitter of less than 500 ns. In other aspects, the de-jitter module uses the timestamp to determine the target transmission time of the PCR MPEG2TS. Alternately stated, the timestamp represents the PCR MPEG2TS target transmission time.

Figure 2:
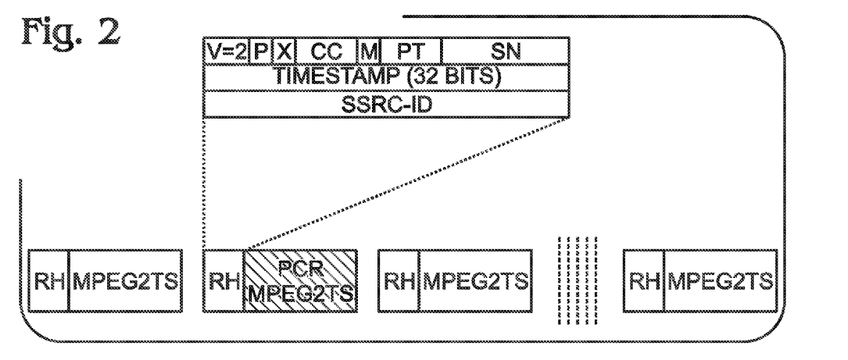
FIG. 2 is a RTP packet protocol drawing illustrating a first aspect of the present invention.

FIG. 2 is a RTP packet protocol drawing illustrating a first aspect of the present invention. In this aspect (as in FIGS. 3 and 4), the de-jitter module accesses a RTP timestamp carried in a RTP packet header. Then, the de-jitter module links the RTP timestamp with a solitary PCR MPEG2TS carried in the RTP packet payload. The RTP timestamp represents the target transmission time of the linked PCR MPEG2TS. Thus, the meaning of the RTP timestamp is not exactly the same as the timestamp in the current version of RFC2250. The exact variable delay introduced by the IP network is not known and, therefore, cannot be corrected. However, the linkage of the PCR MPEG2TS to the RTP timestamp provides a time reference that minimizes the IP network variable delay, as compared with conventional protocol.

Although this protocol is inefficient with respect to the RTP packet carrying the PCR MPEG2TS, it should be remembered that occurrence of such an RTP packet is relatively rare, as PCR MPEG2TS packets occur approximately every 40 milliseconds (ms), or approximately one every 160 MPEG2TS packets in a Standard Definition TV (SDTV) stream. Note, the overhead issue may also be addressed using a header compression scheme.

Figure 3:
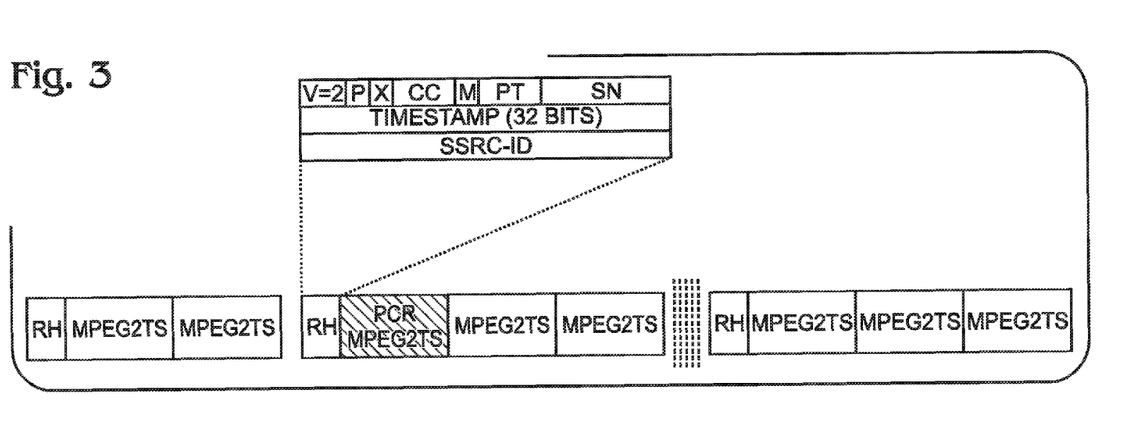
FIG. 3 is an RTP packet protocol drawing illustrating a second aspect of the invention.

FIG. 3 is an RTP packet protocol drawing illustrating a second aspect of the invention. In this aspect, the de-jitter module links the RTP timestamp with a PCR MPEG2TS immediately following the RTP packet header. The RTP timestamp represents the target transmission time of the linked (first) PCR MPEG2TS. Thus, the meaning of the RTP timestamp is not exactly the same as the timestamp in the current version of RFC2250. The linkage of the PCR MPEG2TS to the RTP timestamp provides a time reference that minimizes the IP network variable delay, as compared with conventional protocol.

In other aspects, the RTP timestamp can be linked to some other predetermined position following the RTP packet header, i.e., the second, or the last MPEG2TS with respect to the RTP packet header. Alternately, a reference other than the end of the RTP packet header may be used.

Figure 4:
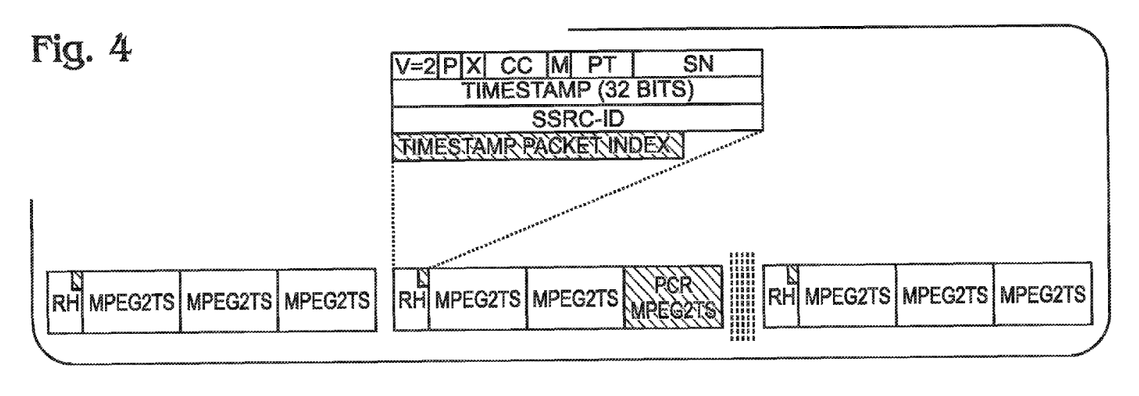
FIG. 4 is an RTP packet protocol drawing illustrating a third aspect of the invention.

FIG. 4 is an RTP packet protocol drawing illustrating a third aspect of the invention. In this aspect, the de-jitter module accesses a timestamp packet index field in the RTP packet header and uses the timestamp packet index to point to a PCR MPEG2TS randomly positioned in the RTP packet payload. For example (as shown), the packet index field may reference the third MPEG2TS packet following the RTP packet header in a first RTP packet. As another example (not shown), the packet index may target a MPEG2TS packet in a fourth position in a second RTP packet. The position of the PCR MPEG2TS can be varied, or made random since the position can be tracked using the index.

The RTP timestamp represents the target transmission time of the linked PCR MPEG2TS. Thus, the meaning of the RTP timestamp is not exactly the same as the timestamp in the current version of RFC2250. The linkage of the PCR MPEG2TS to the RTP timestamp provides a time reference that minimizes the IP network variable delay, as compared with conventional protocol.

Figure 5:
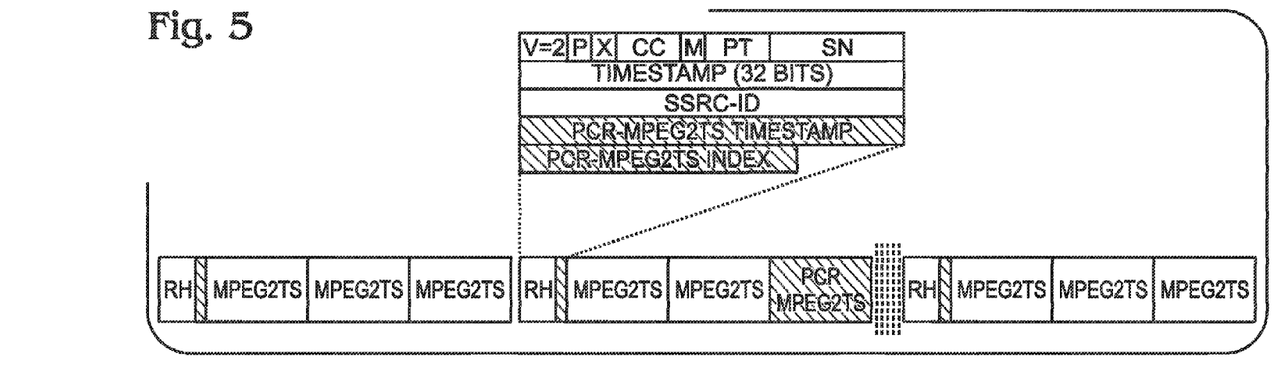
FIG. 5 is an RTP packet protocol drawing illustrating a fourth aspect of the invention.

FIG. 5 is an RTP packet protocol drawing illustrating a fourth aspect of the invention. In this aspect, the de-jitter module accesses a PCR MPEG2TS index field in the RTP packet header, and also accesses a PCR MPEG2TS timestamp carried in a RTP packet header. Note, the RTP packet header may still include a conventional (unmodified) RTP timestamp (as shown). The PCR MPEG2TS timestamp is a different timestamp than the conventional RTP timestamp. The PCR MPEG2TS timestamp field may hold a timestamp value that includes conventional RTP timestamp information, offset with the target transmission time of the linked PCR MPEG2TS. In another aspect, the PCR MPEG2TS timestamp is just the target transmission time, as offset from the RTP timestamp. As in the aspect of FIG. 4, the de-jitter module uses the PCR MPEG2TS index to point to a PCR MPEG2TS randomly positioned in the RTP packet payload. The PCR MPEG2TS timestamp is used to eliminate, or minimize the variable transmission delay jitter.

The PCR MPEG2TS timestamp represents the target transmission time of the linked PCR MPEG2TS. The linkage of the PCR MPEG2TS to the PCR MPEG2TS timestamp provides a time reference that minimizes the IP network variable delay, as compared with conventional protocol.

Figure 6:
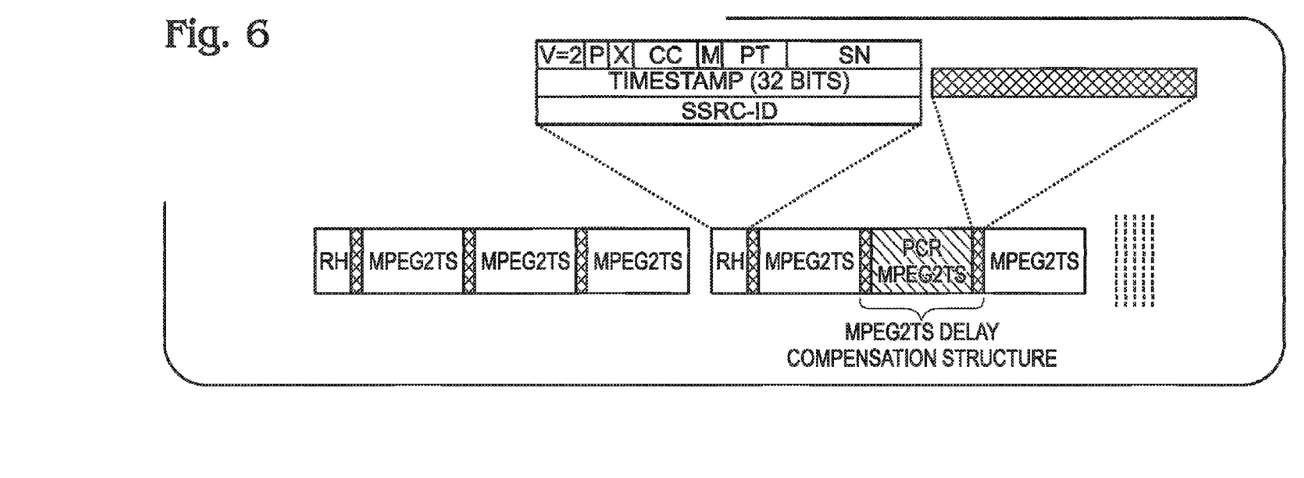
FIG. 6 is an RTP packet protocol drawing illustrating a fifth aspect of the invention.

FIG. 6 is an RTP packet protocol drawing illustrating a fifth aspect of the invention. In this aspect, the de jitter module accesses a local timestamp field in an MPEG2TS delay compensation data structure. The MPEG2TS delay compensation data structure is a new structure that is carried in the RTP packet payload and includes the local timestamp and a corresponding PCR MPEG2TS. The local timestamp is linked to the corresponding PCR MPEG2TS in the MPEG2TS delay compensation data structure. In one aspect, only the PCR MPEG2TS is carried in an MPEG2TS delay compensation data structure.

Alternately, the de-jitter module accesses a local timestamp field in each of a plurality of MPEG2TS delay compensation data structures carried in the RTP packet payload. In this aspect, the MPEG2TS delay compensation data structures may include both PCR and non-PCR MPEG2TSs. Then, local timestamps are linked with corresponding non-PCR MPEG2TSs, as well as with PCR MPEG2TSs. The local timestamps are used to eliminate jitter associated with corresponding non-PCR MPEG2TSs, as well as with PCR MPEG2TSs.

Thus, each MPEG2TS has its own timestamp information, something akin to a 4-byte Source Packet Header (SPH), as defined in IEC 61883. As a result, each MPEG2TS changes from the conventional 188-byte format, to a 192-byte format. The local timestamp represents the target transmission time of the linked MPEG2TS. The linkage of the MPEG2TS to the local timestamp provides a time reference that minimizes the IP network variable delay, as compared with conventional protocol.

Figure 7:
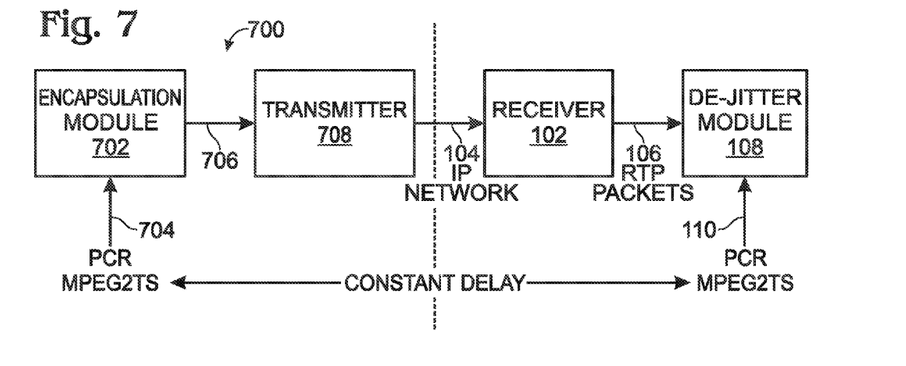
FIG. 7 is a schematic block diagram illustrating the present invention system for transmitting an MPEG2TS in a RTP/UDP/IP packet.

FIG. 7 is a schematic block diagram illustrating the present invention system for transmitting an MPEG2TS in a RTP/UDP/IP packet. The system 700 comprises an encapsulation module 702 having an interface on line 704 to accept a PCR MPEG2TS. The encapsulating module 702 encapsulates the PCR MPEG2TS in a RTP packet payload, and encapsulates a timestamp in a RTP packet referencing the PCR MPEG2TS target transmission time. Further, the encapsulation module encapsulates the RTP packet in an IP packet and supplies the IP packet at an interface on line 706. A transmitter 708 has an interface on line 706 to accept the IP packet and an interface to transmit the IP packet via an IP network on line 104.

In some aspects of the system, the encapsulation module 702 encapsulates a timestamp having a resolution of greater than 500 ns. In other aspects, the encapsulation module 702 encapsulates an RTP timestamp in the RTP packet header.

Returning briefly to FIG. 2, in a first aspect of the invention, the encapsulation module encapsulates a solitary PCR MPEG2TS in the RTP packet payload.

Returning to FIG. 3, in a second aspect of the invention, the encapsulation module encapsulates the PCR MPEG2TS in the RTP packet payload, immediately following the RTP header. Note, other predetermined positions besides the position immediately following the RTP packet header can also be used.

Returning to FIG. 4, in a third aspect of the invention, the encapsulation module encapsulates a PCR MPEG2TS randomly positioned in the RTP packet payload. The encapsulation module also encapsulates a timestamp packet index in the RTP packet header pointing to the position of the MPEG2TS in the RTP packet payload.

Returning to FIG. 5, in a fourth aspect of the invention, the encapsulation module encapsulates a PCR MPEG2TS randomly positioned in the RTP packet payload. The encapsulation module encapsulates a PCR MPEG2TS timestamp (as explained above), and encapsulates a PCR MPEG2TS index field in the RTP packet header. The PCR MPEG2TS index points to the position of the MPEG2TS in the RTP packet payload.

Returning to FIG. 6, in a fifth aspect of the invention, the encapsulation module encapsulates the PCR MPEG2TS in an MPEG2TS delay compensation structure (as explained above), which is carried in the RTP packet payload. The encapsulation module encapsulates a local timestamp in the MPEG2TS delay compensation data structure, referencing the co-encapsulated PCR MPEG2TS. In a related aspect, the encapsulation module receives and encapsulates a plurality of MPEG2TSs that can be either PCR MPEG2TSs and non-PCR MPEG2TSs, in a corresponding plurality of MPEG2TS delay compensation structures. The encapsulation module encapsulates a local timestamp field in each MPEG2TS delay compensation structure, referencing a co-encapsulated MPEG2TS.

Functional Description

Figure 8:
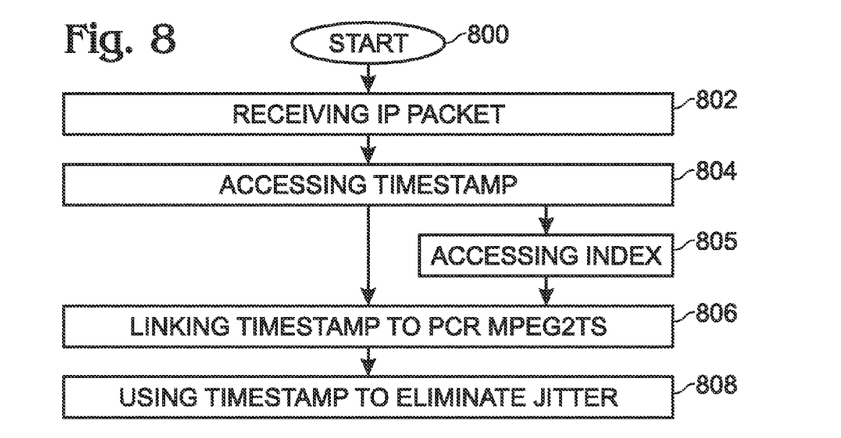
FIG. 8 is a flowchart illustrating the present invention method for receiving an MPEG2TS in a RTP/UDP/IP packet.

FIG. 8 is a flowchart illustrating the present invention method for receiving an MPEG2TS in a RTP/UDP/IP packet. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 800.

Step 802 receives an IP packet via an IP network, having a variable transmission delay. Step 804 accesses a timestamp carried in a RTP packet. Step 806 links the timestamp with a program clock reference (PCR) MPEG2TS carried in the RTP packet payload. Step 808 uses the timestamp to eliminate variable transmission delay jitter, associated with the PCR MPEG2TS. In some aspects, using the timestamp to eliminate variable transmission delay jitter includes using the timestamp to determine the target transmission time of the PCR MPEG2TS.

In some aspects of the method, accessing the timestamp carried in the RTP packet is Step 804 includes accessing a timestamp having a resolution of greater than 500 nanoseconds (ns). This solution requires that the conventional RTP timestamp be modified. Then, using the timestamp to eliminate variable transmission delay jitter in Step 808 includes reducing the jitter to less than 500 ns.

In some aspects, accessing a timestamp carried in the RTP packet (Step 804) includes accessing a RTP timestamp carried in a RTP packet header. In other aspects, a new type of timestamp is accessed.

In one aspect of the invention, linking the timestamp with a PCR MPEG2TS carried in the RTP packet payload (Step 806) includes linking the RTP timestamp with a solitary PCR MPEG2TS carried in the RTP packet payload (see FIG. 2).

In a different aspect of the invention, linking the timestamp with a PCR MPEG2TS carried in the RTP packet payload (Step 806) includes linking the RTP timestamp with a PCR MPEG2TS immediately following the RTP packet header (see FIG. 3).

In another aspect of the invention, Step 805 accesses an index field in the RTP packet header. Then, linking the timestamp with a PCR MPEG2TS carried in the RTP packet payload (Step 806) includes using the index to point to a PCR MPEG2TS randomly positioned in the RTP packet payload. In a first variation, the accessed index field (Step 805) is a timestamp packet index field, and Step 806 uses the timestamp packet index to link an RTP timestamp to a PCR MPEG2TS randomly positioned in the RTP packet payload (see FIG. 4). In a second variation, the accessed index field (Step 805) is a PCR MPEG2TS index field, and Step 804 accesses a PCR MPEG2TS timestamp carried in a RTP packet header. Note, the PCR MPEG2TS timestamp and the PCR MPEG2TS index fields are new fields with respect to the current revision of RFC 2250. Then, Step 806 uses the PCR MPEG2TS index to point to a PCR MPEG2TS randomly positioned in the RTP packet payload (see FIG. 5).

In another aspect, Step 804 accesses a local timestamp field in an MPEG2TS delay compensation data structure. The MPEG2TS delay compensation data structure is a new structure that is carried in the RTP packet payload and includes the local timestamp and a corresponding PCR MPEG2TS. Then, Step 806 links the local timestamp to the corresponding PCR MPEG2TS in the MPEG2TS delay compensation data structure (see FIG. 6). In a variation, Step 804 accesses local timestamp fields in each of a plurality of MPEG2TS delay compensation data structures carried in the RTP packet payload. In this case, the MPEG2TS delay compensation data structures may include either PCR or non-PCR MPEG2TSs. Then, Step 806 additionally links local timestamps with corresponding non-PCR MPEG2TSs, and Step 808 uses the local timestamps to eliminate variable transmission delay jitter, associated with the non-PCR MPEG2TSs.

Figure 9:
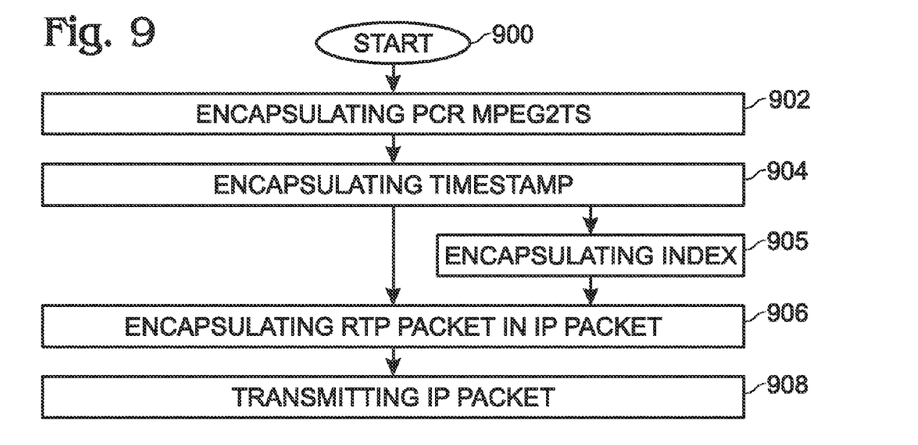
FIG. 9 is a flowchart illustrating the present invention method for transmitting an MPEG2TS in a RTP/UDP/IP packet.

FIG. 9 is a flowchart illustrating the present invention method for transmitting an MPEG2TS in a RTP/UDP/IP packet. The method starts at Step 900. Step 902 encapsulates a PCR MPEG2TS in the RTP packet payload. Step 904 encapsulates a timestamp in a RTP packet, referencing the PCR MPEG2TS target transmission time. Step 906 encapsulates the RTP packet in an IP packet. Step 908 transmits the IP packet via an IP network.

In some aspects, encapsulating a timestamp in a RTP packet in Step 904 includes encapsulating a timestamp having a resolution of greater than 500 ns. In other aspects, Step 904 encapsulates an RTP timestamp in the RTP packet header to reference the PCR MPEG2TS. In different aspects, a new timestamp is used to reference the PCR MPEG2TS, regardless of whether the RTP timestamp is present, or not.

In one aspect, encapsulating a PCR MPEG2TS in the RTP packet payload (Step 902) includes encapsulating a solitary PCR MPEG2TS in the RTP packet payload (see FIG. 2).

In a different aspect, encapsulating a PCR MPEG2TS in the RTP packet payload (Step 902) includes encapsulating the PCR MPEG2TS in the RTP packet payload, immediately following the RTP header (see FIG. 3).

In another aspect, encapsulating a PCR MPEG2TS in the RTP packet payload (Step 902) includes encapsulating a PCR MPEG2TS randomly positioned in the RTP packet payload. An additional step, Step 905 encapsulates an index in the RTP packet header pointing to the position of the MPEG2TS in the RTP packet payload. In one variation, encapsulating a timestamp in a RTP packet (Step 904) includes encapsulating an RTP timestamp in the RTP packet header, and encapsulating an index in the RTP packet header (Step 905) includes encapsulating a timestamp packet index in the RTP packet header (see FIG. 4).

In another variation, encapsulating a timestamp in the RTP packet (Step 904) includes encapsulating a PCR MPEG2TS timestamp, and encapsulating an index in the RTP packet header (Step 905) includes encapsulating a PCR MPEG2TS index field in the RTP packet header (see FIG. 5).

In another aspect of the method, encapsulating a PCR MPEG2TS in the RTP packet payload (Step 902) includes encapsulating the PCR MPEG2TS in an MPEG2TS delay compensation structure, carried in the RTP packet payload. Encapsulating a timestamp in the RTP packet (Step 904) includes encapsulating a local timestamp in the MPEG2TS delay compensation data structure, referencing the co-encapsulated PCR MPEG2TS (see FIG. 6). In a variation of this aspect, Step 902 encapsulates a plurality of MPEG2TSs, either PCR MPEG2TSs or non-PCR MPEG2TSs, in a corresponding plurality of MPEG2TS delay compensation structures (one per delay compensation structure). Then, encapsulating a local timestamp field in the MPEG2TS delay compensation data structure (Step 904) includes encapsulating a local timestamp field in each MPEG2TS delay compensation structure, referencing a co-encapsulated MPEG2TS.

Systems and methods have been presented for eliminating, and/or greatly reducing the variable time delay associated with IP packet communications. The present invention makes RTP a useful means of transporting MPEG2TS via a wireless local area network (wLAN). A few simple examples have been provided to show how the RTP timestamp, or a new timestamp may be used in the process. However, other related timestamp variations will occur to those skilled in the art. Likewise, increased clock resolution and index field solutions have been present to exemplify other aspects. Again, related variations and embodiments of the invention are likely to occur to those skilled in this field of art.

I claim:

1. A method for receiving an MPEG2 transport stream (TS) in a real-time protocol (RTP)/user datagram protocol (UDP)/Internet protocol (IP) packet, the method comprising:
   receiving an IP packet via an IP network, having a variable transmission delay;
   accessing a timestamp carried in a RTP packet;
   accessing an index field in the RTP packet header;
   linking the timestamp with a program clock reference (PCR) MPEG2TS carried in the RTP packet payload by using the index to point to a PCR MPEG2TS randomly positioned in the RTP packet payload; and,
   using the timestamp to eliminate variable transmission delay jitter, associated with the PCR MPEG2TS.

2. The method of claim 1 wherein accessing the timestamp carried in the RTP packet includes accessing a timestamp having a resolution of greater than 500 nanoseconds (ns); and,
   wherein using the timestamp to eliminate variable transmission delay jitter, associated with the PCR MPEG2TS, includes reducing the jitter to less than 500 ns.

3. The method of claim 1 wherein accessing a timestamp carried in the RTP packet includes accessing a RTP timestamp carried in a RTP packet header.

4. The method of claim 3 wherein linking the timestamp with a PCR MPEG2TS carried in the RTP packet payload includes linking the RTP timestamp with a solitary PCR MPEG2TS carried in the RTP packet payload.

5. The method of claim 1 wherein accessing an index field in the RTP packet header includes accessing a timestamp packet index field; and,
   wherein linking the timestamp with a PCR MPEG2TS carried in the RTP packet payload includes using the timestamp packet index to link an RTP timestamp to a PCR MPEG2TS randomly positioned in the RTP packet payload.

6. The method of claim 1 wherein accessing an index field in the RTP packet header includes accessing a PCR MPEG2TS index field;

wherein accessing a timestamp carried in the RTP packet
includes accessing a PCR MPEG2TS timestamp carried
in a RTP packet header; and, wherein linking the timestamp with a PCR MPEG2TS
carried in the RTP packet payload includes using the
PCR MPEG2TS index to point to a PCR MPEG2TS
randomly positioned in the RTP packet payload.

7. The method of claim 1 wherein using the timestamp to eliminate variable transmission delay jitter, associated with the PCR MPEG2TS, includes using the timestamp to determine the target transmission time of the PCR MPEG2TS.

8. A method for transmitting an MPEG2 transport stream (TS) in a real-time protocol (RTP)/user datagram protocol (UDP)/Internet protocol (IP) packet, the method comprising:
encapsulating a program clock reference (PCR) MPEG2TS in the RTP packet payload;
encapsulating a timestamp randomly positioned in a RTP packet payload, referencing the PCR MPEG2TS target transmission time;
encapsulating the RTP packet in an IP packet;
encapsulating an index in the RTP packet header pointing to the position of the MPEG2TS in the RTP packet payload; and,
transmitting the IP packet via an IP network.

9. The method of claim 8 wherein encapsulating a timestamp in a RTP packet, referencing the PCR MPEG2TS, includes encapsulating a timestamp having a resolution of greater than 500 nanoseconds (ns).

10. The method of claim 8 wherein encapsulating a timestamp in a RTP packet includes encapsulating an RTP timestamp in the RTP packet header.

11. The method of claim 10 wherein encapsulating a PCR MPEG2TS in the RTP packet payload includes encapsulating a solitary PCR MPEG2TS in the RTP packet payload.

12. The method of claim 8 wherein encapsulating a timestamp in a RTP packet includes encapsulating an RTP timestamp in the RTP packet header; and,
wherein encapsulating an index in the RTP packet header includes encapsulating a timestamp packet index in the RTP packet header.

13. The method of claim 8 wherein encapsulating a timestamp in the RTP packet includes encapsulating a PCR MPEG2TS timestamp; and,
wherein encapsulating an index in the RTP packet header includes encapsulating a PCR MPEG2TS index field in the RTP packet header.

14. A system for receiving an MPEG2 transport stream (TS) in a real-time protocol (RTP)/user datagram protocol (UDP)/Internet protocol (IP) packet, the system comprising:
a decoder having an IP network interface to receive an IP packet via an IP network, having a variable transmission delay, and an interface to supply a RTP packet;
a buffer having an interface to accept the RTP packet, the buffer accessing a timestamp packet index field carried in a RTP packet header and uses the timestamp jacket index to point to a PCR MPEG2TS randomly positioned in the RTP packet payload, linking the timestamp with a program dock reference (PCR) MPEG2TS carried in the RTP packet payload, and using the timestamp to eliminate variable transmission delay jitter, the buffer having an interface to supply the PCR MPEG2TS with a constant delay; and,
a system clock having an interface to receive the PCR MPEG2TS with the constant delay and to provide a synchronized system time.

15. The system of claim 14 wherein the buffer accesses a timestamp having a resolution of greater than 500 nanoseconds (ns) and supplies a PCR MPEG2TS with a jitter of less than 500 ns.

16. The system of claim 14 wherein the buffer accesses a RTP timestamp carried in a RTP packet header.

17. The system of claim 16 wherein the buffer links the RTP timestamp with a solitary PCR MPEG2TS carried in the RTP packet payload.

18. The system of claim 14 wherein the buffer accesses a PCR MPEG2TS index field in the RTP packet header, accesses a PCR MPEG2TS timestamp carried in a RTP packet header, uses the PCR MPEG2TS index to point to a PCR MPEG2TS randomly positioned in the RTP packet payload, and uses the PCR MPEG2TS timestamp to eliminate variable transmission delay jitter.

19. The method of claim 14 wherein the buffer uses the timestamp to determine the target transmission time of the PCR MPEG2TS.

20. A system for transmitting an MPEG2 transport stream (TS) in a real-time protocol (RTP)/user datagram protocol (UDP)/Internet protocol (IP) packet, the system comprising:
a system clock having an interface to supply a program clock reference (PCR) MPEG2TS;
a buffer having an interface to accept the PCR MPEG2TS, the buffer randomly positioning the PCR MPEG2TS in a RTP packet payload, encapsulating a timestamp packet index in the RTP packet header referencing the PCR MPEG2TS target transmission time, encapsulating the RTP packet in an IP packet, the timestamp packet index, pointing to the position of the MPEG2TS in the RTP packet payload, and supplying the IP packet at an interface; and,
a system coder having an interface to accept the IP packet and an interface to transmit the IP packet via, art IP network.

21. The system of claim 20 wherein the buffer encapsulates a timestamp having a resolution of greater than 500 nanoseconds (ns).

22. The system of claim 20 wherein the buffer encapsulates an RTP timestamp in the RTP packet header.

23. The system of claim 22 wherein the buffer encapsulates a solitary PCR MPEG2TS in the RTP packet payload.

24. The system of claim 20 wherein the buffer encapsulates a PCR MPEG2TS randomly positioned in the RTP packet payload, encapsulates a PCR MPEG2TS timestamp, and encapsulates a PCR MPEG2TS index field in the RTP packet header pointing to the position of the MPEG2TS in the RTP packet payload.

25. A method for receiving an MPEG2 transport stream (TS) in a real-time protocol (RTP)/user datagram protocol (UDP)/Internet protocol (IP) packet, the method comprising:
receiving an IP packet via an IP network, having a variable transmission delay;
accessing a local timestamp field in an MPEG2TS delay compensation data structure, where the MPEG2TS delay compensation data structure is carried in the RTP packet payload and includes the local timestamp and a corresponding PCR MPEG2TS;
linking the timestamp with a program clock reference (PCR) MPEG2TS carried in the RTP packet payload;
using the timestamp to eliminate variable transmission delay jitter, associated with the PCR MPEG2TS; and,
wherein linking the timestamp with a PCR MPEG2TS carried in the RTP packet includes linking the local timestamp to the corresponding PCR MPEG2TS in the MPEG2TS delay compensation data structure.

26. The method of claim 25 wherein accessing a local timestamp field in an MPEG2TS delay compensation data structure includes accessing a local timestamp field in each of a plurality of MPEG2TS delay compensation data structures carried in the RTP packet payload, where the MPEG2TS delay compensation data structures include an MPEG2TS selected from the group including PCR and non-PCR MPEG2TSs;

wherein linking the timestamp with a PCR MPEG2TS carried in the RTP packet payload additionally includes linking local timestamps with corresponding non-PCR MPEG2TSs; and, wherein using the timestamp to eliminate variable transmission delay jitter, associated with the PCR MPEG2TS, additionally includes using the local timestamps to eliminate jitter associated with corresponding non-PCR MPEG2TSs.

27. A method for transmitting an MPEG2 transport stream (TS) in a real-time protocol (RTP)/user datagram protocol (UDP)/Internet protocol (IP) packet the method comprising:

encapsulating a program clock reference (PCR) MPEG2TS in an MPEG2TS delay compensation structure, carried in the RTP packet payload;

encapsulating a timestamp in a RTP packet, referencing the PCR MPEG2TS target transmission time;

encapsulating the RTP packet in an IP packet;

transmitting the IP packet via an IP network; and, wherein encapsulating a timestamp in the RTP packet includes encapsulating a local timestamp in the MPEG2TS delay compensation data structure, referencing the co-encapsulated PCR MPEG2TS.

28. The method of claim 27 wherein encapsulating the PCR MPEG2TS in an MPEG2TS delay compensation structure includes encapsulating a plurality of MPEG2TSs, selected from the group including PCR MPEG2TSs and a non-PCR MPEG2TSs, in a corresponding plurality of MPEG2TS delay compensation structures; and, wherein encapsulating a local timestamp field in the MPEG2TS delay compensation data structure includes encapsulating a local timestamp field in each MPEG2TS delay compensation structure, referencing a co-encapsulated MPEG2TS.

* * * * *